Oct. 11, 1960

C. V. DAVID ET AL 2,955,418

COMBINATION AUGMENTER, SOUND SUPPRESSOR AND
THRUST REVERSER FOR JET ENGINES

Filed Aug. 6, 1958

INVENTORS.
CONSTANT V. DAVID
JOHN W. BAXTER
BY

Knox & Knox

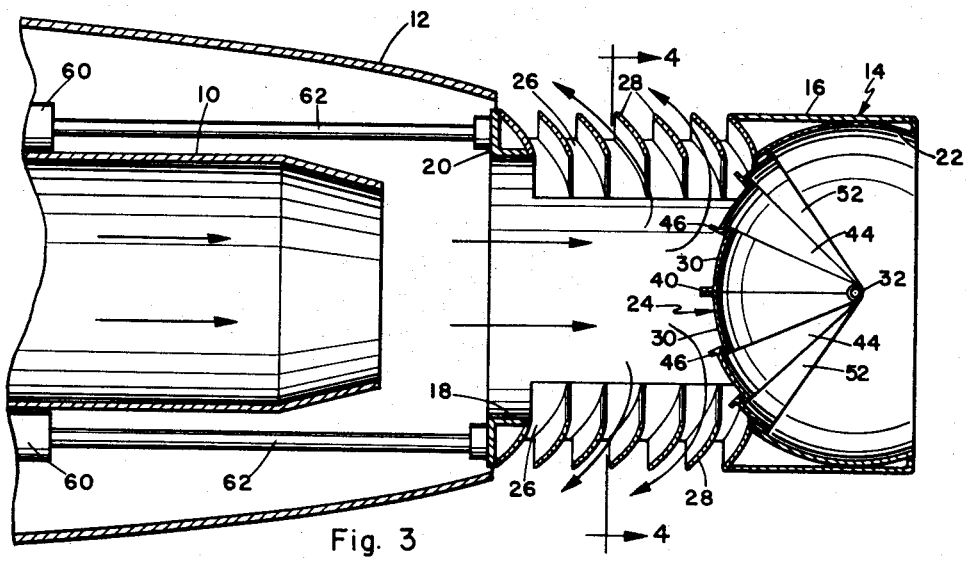
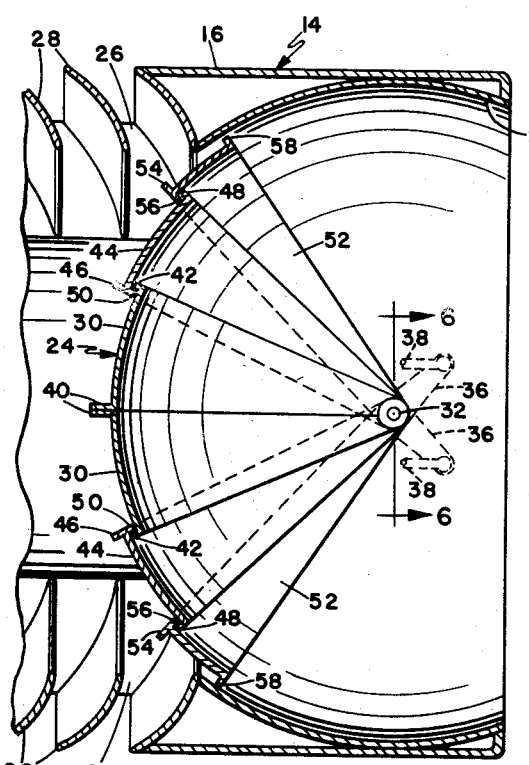
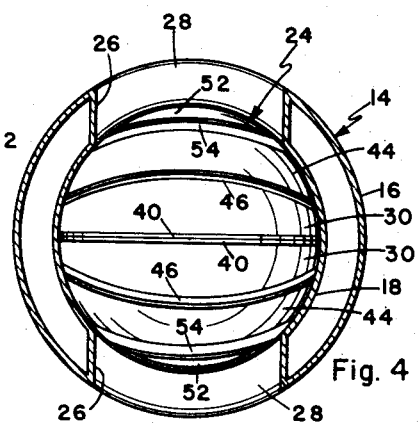
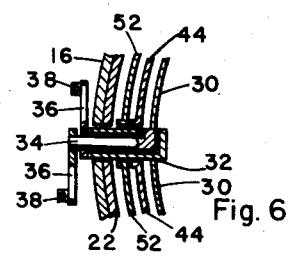
Fig. 3
Fig. 4
Fig. 5
Fig. 6
INVENTORS.
CONSTANT V. DAVID
JOHN W. BAXTER
BY
Knox & Knox United States Patent Office 2,955,418
Patented Oct. 11, 1960

2,955,418

COMBINATION AUGMENTER, SOUND SUPPRESSOR AND THRUST REVERSER FOR JET ENGINES

Constant V. David and John W. Baxter, San Diego, Calif., assignors to Ryan Aeronautical Co., San Diego, Calif.

Filed Aug. 6, 1958, Ser. No. 753,458

3 Claims. (Cl. 60—35.54)

The present invention relates generally to aircraft jet engines and more particularly to a combination augmenter, sound suppressor and thrust reverser for jet engines.

The primary object of this invention is to provide a structure for attachment to a jet engine nozzle which will augment the thrust of the engine while suppressing the noise of the exhaust gases, by mixing auxiliary cool air with the hot gases in their natural direction of flow.

Another object of this invention is to provide a thrust augmenter structure containing a retractable baffle which, when extended, blocks the nozzle and causes reversal of the gas flow through the augmenter for braking of the aircraft.

A further object of this invention is to provide a thrust reverser which is virtually fail-safe, in that the exhaust gas flow against the baffle tends to retract the baffle so that full normal thrust is immediately available in an emergency.

Still another object of this invention is to provide a combination augmenter, sound suppressor and thrust reverser which is contained in a compact slidable sleeve structure around the jet nozzle and which does not interfere with normal operation of the engine.

Finally, it is an object to provide an augmenter and thrust reverser structure of the aforementioned character which is simple to install and operate and which will greatly increase the effectiveness of the jet engine in controlling aircraft performance.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 3 is a sectional view similar to Figure 2 with the thrust reverser in operative position;

Figure 4 is a sectional view taken on the line 4—4 of Figure 3;

Figure 5 is an enlarged fragmentary sectional view similar to a portion of Figure 3, showing the structural details of the thrust reverser baffle; and Figure 6 is a fragmentary sectional view taken on the line 6—6 of Figure 5.

Similar characters of reference indicate similar or identical elements and portions throughout the specification and throughout the views of the drawings.

Figure 1:
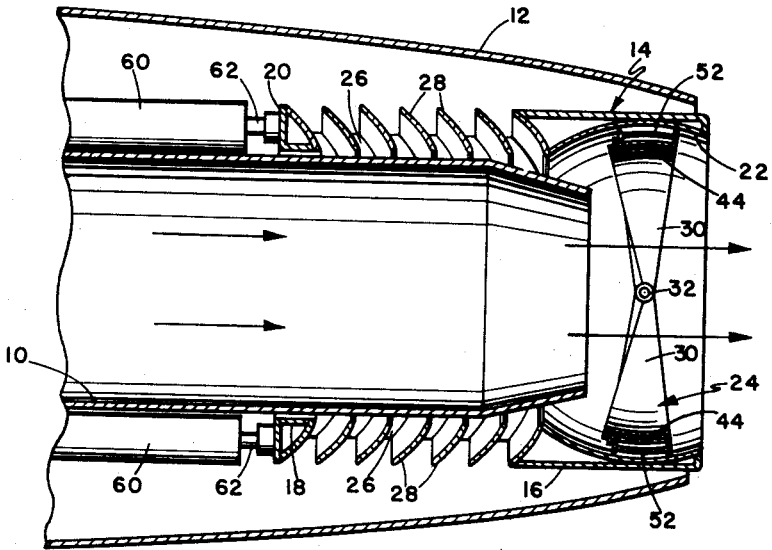
Figure 1 is a fragmentary longitudinal sectional view of a jet engine nozzle with the augmenter structure in retracted and non-operative position.

Referring now to the drawings in detail, the device is mounted on a jet engine having a tailpipe 10 and is enclosed in an airframe 12, such as a fuselage or nacelle. The mechanism is contained in a double walled sleeve assembly 14 comprising an outer sleeve 16 and an inner sleeve 18, connected at the forward end by an end ring 20, said inner sleeve being dimensioned to fit over the tailpipe 10. At the rear end, the inner sleeve 18 expands into a spheroidal portion 22 which contains the thrust reverser baffle 24. Between the end ring 20 and the spheroidal portion 22 are two large opposed openings 26 extending through both the inner and outer sleeves 18 and 16 respectively, said openings each containing a plurality of longitudinally spaced guide vanes 28 of suitable aerodynamic shape, to guide auxiliary outside air in through said openings to enter the main exhaust stream in substantially the same direction as the exhaust gas flow. The openings 26 may be of any reasonable size and shape and may be above or below the tailpipe 10, or at the sides thereof. Alternatively, several smaller openings may be distributed around the circumference of the sleeve assembly 14.

The baffle 24 comprises a plurality of overlapping, opposed pairs of spheroidal segments, three pairs being illustrated although more or less may be used as required. The inner segments 30 are mounted on coaxial hinge pins 32 and 34 on a diametrical axis in the spheroidal portion 22, said hinge pins extending outside the outer sleeve 16 and having radially extending actuating arms 36 fixed thereto. A pair of control rods 38 are pivotally connected to the actuating arms 36 so that, by axial movement of said control rods, the inner segments 30 can be swung about the axis of hinge pins 32 and 34. The control rods 38 are connected to a suitable operating mechanism such as a hydraulic jack, or actuator of any type. It should be understood that the inner segments 30 may be actuated by mechanism other than that illustrated, such devices being well known in the art. The inner segments 30 have radially outwardly extending flanges 40 along their forward edges and small outwardly extending lips 42 at their rear edges. The intermediate segments 44 are pivotally mounted on the hinge pins 32 and have outwardly extending flanges 46 at their forward edges and small outwardly extending lips 48 at their rear edges. Each intermediate segment 44 also has a small inwardly projecting catch lip 50 at the forward edge thereof which overlaps the lip 42 of the corresponding inner segment 30. The outer segments 52 are also pivotally mounted on the hinge pins 32 and each have an outwardly extending flange 54 at the forward edge thereof and an inwardly projecting catch lip 56 opposed to said flange to overlap the lips 48. Each outer segment 52 also has an outwardly projecting seal lip 58 at the rear edge thereof.

By using a multi-segmented baffle 24, the assembly is easily retracted into a minimum of space clear of the exhaust stream and, only the inner segments need be power operated due to the engaging lips on the segments, as will hereinafter be apparent.

Figure 2:
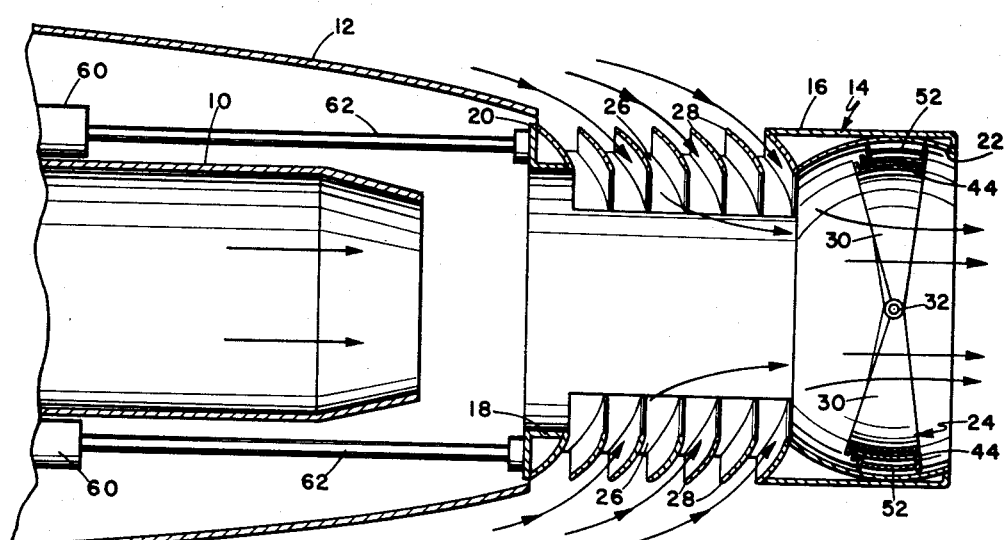
Figure 2 is a sectional view similar to Figure 1, but showing the device extended for use as an augmenter and sound suppressor.

The entire sleeve assembly 14 is mounted on suitable actuating rams 60 having piston rods 62, so that said sleeve assembly can be extended beyond the tailpipe 10. For normal operation the sleeve assembly 14 is retracted and does not interfere in any way with the engine operation or the exhaust gases. For take-off, the sleeve assembly 14 is extended, as in Figure 2, so that the exhaust gases flow through the inner sleeve 18 and induce a flow of secondary air inwardly through the openings 26, as indicated by the directional arrows. This secondary air is mixed with the exhaust gases and adds to the mass flow to increase the thrust, the sleeve assembly thus acting as an augmenter. In forward flight, considerable ram air is directed through the openings 26 by the guide vanes 28 and further augments the thrust. In addition to thrust augmentation, the secondary air cools the exhaust gases and also sets up downstream turbulence at the periphery of the gas stream, which has the effect of suppressing the noise of the jet exhaust, the effect of such mixing being well known. In normal flight, the sleeve assembly 14 is retracted to decrease drag.

For landing the sleeve assembly 14 is fully extended and, when deceleration is required, the thrust reverser baffle 24 is extended. This is accomplished by moving the actuating arms 36 rearwardly to swing the inner segments 30 inwardly, the lips 42 engaging the catch lips 52 and pulling the intermediate segments 44 inwardly, while the lips 48 engage the catch lips 56 and pick up the outer segments 52, as in Figures 3 and 4. Thus by powering the inner segments 30 only, the entire baffle 24 can be extended to block the inner sleeve 18 completely and cause the exhaust gases to be deflected outwardly and forwardly for reverse thrust, as indicated by directional arrows in Figure 3. The flanges 40, 46 and 54 offer considerable drag, as will be evident from Figure 4, and the reaction of the exhaust gases against the flanges tends to push the baffle segments outwardly to their retracted position. Further, since the baffle segments are spheroidal, the resultant pressure of gases on their surfaces is effective substantially through the center of articulation of the segments, or at the hinge pins 32 and 34, which results in a considerable reduction in the power needed to move the segments in the gas stream. By proper contouring of the segments, resultant gas pressure force can be utilized to urge the segments to the open position. This is a valuable safety feature since, in the event of failure of the baffle actuating mechanism, the exhaust pressure automatically opens the baffle to provide full normal thrust and makes the complete thrust reverser baffle 24 self-neutralizing.

The augmenter, sound suppressor and thrust reverser are combined in a single, compact structural unit which fits closely around the jet engine tailpipe and is well clear of the jet exhaust when not in use and a simple axial movement brings the unit into operating position. The unit is constructed according to aircraft standards and the specific structural details may vary to suit a particular engine and airframe combination.

The operation of this invention will be clearly comprehended from a consideration of the foregoing description of the mechanical details thereof, taken in connection with the drawings and the above recited objects. It will be obvious that all said objects are amply achieved by this invention.

We claim:

1. A combination augmenter, sound suppressor and thrust reverser for use with a jet engine having an exhaust conducting tailpipe, comprising: a sleeve assembly mounted concentrically with the tailpipe; means for moving said sleeve assembly axially between a retracted position substantially surrounding the tailpipe and an extended position rearwardly of the tailpipe; said sleeve assembly having transverse openings therein; and guide vanes in said openings to conduct a flow of secondary air from outside said sleeve assembly inwardly into the jet exhaust stream when the sleeve assembly is extended, whereby the jet thrust is augmented and the sound produced thereby is suppressed by mixing of the exhaust and the secondary air; said sleeve assembly having a spheroidal fixed portion rearwardly of said openings; a thrust reverser baffle assembly comprising a plurality of opposed pairs of generally spheroidal segments pivotally mounted in said spheroidal portion on a substantially diametrical axis; and means for swinging said baffle segments forwardly and inwardly to form a portion of a sphere having its convex surface facing forwardly and blocking said sleeve assembly to divert the exhaust stream outwardly and forwardly through said openings.

2. A combination augmenter, sound suppressor and thrust reverser for use with a jet engine having an exhaust conducting tailpipe, comprising: a sleeve assembly mounted concentrically with the tailpipe; means for moving said sleeve assembly axially between a retracted position substantially surrounding the tailpipe and an extended position rearwardly of the tailpipe; said sleeve assembly having transverse openings therein; and guide vanes in said openings to conduct a flow of secondary air from outside said sleeve assembly inwardly into the jet exhaust stream when the sleeve assembly is extended, whereby the jet thrust is augmented and the sound produced thereby is suppressed by mixing of the exhaust and the secondary air; said sleeve assembly having a spheroidal fixed portion rearwardly of said openings; a thrust reverser baffle assembly comprising a plurality of opposed pairs of generally spheroidal segments pivotally mounted in said spheroidal portion on a substantially diametrical axis; said segments being overlapping in a retracted position within said spheroidal portion; said segments having interlocking lip portions engageable with each other when the segments are extended, so that one pair of segments engages and extends the remaining segments; and means for swinging said segments inwardly to form a portion of a sphere having its convex surface facing forwardly and blocking said sleeve assembly, whereby the exhaust stream is diverted outwardly and forwardly through said openings.

3. A combination augmenter, sound suppressor and thrust reverser for use with a jet engine having an exhaust conducting tailpipe, comprising: a sleeve assembly mounted concentrically with the tailpipe; means for moving said sleeve assembly axially between a retracted position substantially surrounding the tailpipe and an extended position rearwardly of the tailpipe; said sleeve assembly having transverse openings therein; and guide vanes in said openings to conduct a flow of secondary air from outside said sleeve assembly inwardly into the jet exhaust stream when the sleeve assembly is extended, whereby the jet thrust is augmented and the sound produced thereby is suppressed by mixing of the exhaust and the secondary air; said sleeve assembly having a spheroidal fixed portion rearwardly of said openings; a thrust reverser baffle assembly comprising a plurality of opposed pairs of generally spheroidal segments pivotally mounted in said spheroidal portion on a substantially diametrical axis; said segments being overlapping in a retracted position within said spheroidal portion; said segments having interlocking lip portions engageable with each other when the segments are extended, so that one pair of segments engages and extends the remaining segments; and means for swinging said segments forwardly and inwardly to form a portion of a sphere having its convex surface facing forwardly and blocking said sleeve assembly to divert the exhaust stream outwardly and forwardly through said openings; said segments having drag producing flanges extending from their convex surfaces, whereby the reaction of the exhaust stream against said flanges tends to force said segments outwardly and rearwardly to their retracted position.

References Cited in the file of this patent

UNITED STATES PATENTS

| | | |
|---|---|---|
| 2,654,215 | Thompson | Oct. 6, 1953 |
| 2,692,024 | Burdett et al. | Oct. 19, 1954 |
| 2,735,264 | Jewett | Feb. 21, 1956 |
| 2,780,058 | Beale et al. | Feb. 5, 1957 |
| 2,841,956 | Gunson et al. | July 9, 1958 |
| 2,848,867 | Hausmann | Aug. 26, 1958 |
| 2,886,946 | Parker | May 19, 1959 |

FOREIGN PATENTS

| | | |
|---|---|---|
| 103,325 | Great Britain | Jan. 19, 1917 |
| 654,904 | Great Britain | July 4, 1951 |
| 739,500 | Great Britain | Nov. 2, 1955 |
| 740,385 | Great Britain | Nov. 9, 1955 |
| 778,008 | Great Britain | July 3, 1957 |